United States Patent
Xing et al.

(10) Patent No.: US 11,477,710 B2
(45) Date of Patent: Oct. 18, 2022

(54) METHOD AND APPARATUS FOR REALIZING DYNAMIC POINT SELECTION

(71) Applicant: Nokia Solutions and Networks Oy, Espoo (FI)

(72) Inventors: Liang Xing, Hangzhou (CN); Richa Gupta, Bangalore (IN); Suresh Kalyanasundaram, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 232 days.

(21) Appl. No.: 16/652,834

(22) PCT Filed: Oct. 20, 2017

(86) PCT No.: PCT/CN2017/107161
§ 371 (c)(1),
(2) Date: Apr. 1, 2020

(87) PCT Pub. No.: WO2019/075761
PCT Pub. Date: Apr. 25, 2019

(65) Prior Publication Data
US 2020/0314706 A1 Oct. 1, 2020

(51) Int. Cl.
*H04W 36/00* (2009.01)
*H04B 7/024* (2017.01)
*H04W 36/30* (2009.01)

(52) U.S. Cl.
CPC ........ *H04W 36/0069* (2018.08); *H04B 7/024* (2013.01); *H04W 36/30* (2013.01)

(58) Field of Classification Search
CPC ... H04L 5/0057; H04L 5/0035; H04L 5/0073; H04L 5/006; H04B 7/024; H04B 17/309;
(Continued)

(56) References Cited

U.S. PATENT DOCUMENTS

| | | | |
|---|---|---|---|
| 9,246,558 B2 * | 1/2016 | Ng | H04L 1/0077 |
| 2012/0039260 A1 * | 2/2012 | Song | H04L 1/0045 |
| | | | 370/328 |

(Continued)

FOREIGN PATENT DOCUMENTS

| | | | | |
|---|---|---|---|---|
| CN | 104769871 A | 7/2015 | | |
| WO | WO-2013067689 A1 * | 5/2013 | ............. | H04B 7/024 |
| WO | 2014/109548 A1 | 7/2014 | | |

OTHER PUBLICATIONS

Extended European Search Report received for corresponding European Patent Application No. 17928885.7, dated Jun. 2, 2021, 12 pages.

(Continued)

*Primary Examiner* — Allahyar Kasraian
(74) *Attorney, Agent, or Firm* — Joseph C. Drish; Harrington & Smith

(57) ABSTRACT

Methods and apparatus for realizing dynamic point selection improve the cell-edge throughput and geometric mean of release 8/9 UEs. The method comprises a step of receiving estimated channel quality reported by all the TPs in the CoMP set, a step of switching the serving TP for the UEs based on the estimated channel quality and/or cell load, a step of forwarding the scheduled data from the primary TP to the serving TP, a step of separately transmitting PDCCH to the UEs by the primary TP and transmitting PDSCH to the UEs by the serving TP. the implementation of the method and apparatus improves the cell-edge throughput and geometric mean of UE throughput by serving UEs instantaneously from the cell that provides better throughput accounting for fast time-scale channel fluctuations and/or load. It helps in reducing interference due to data getting drained faster when users are served from cells with better channel conditions.

20 Claims, 6 Drawing Sheets

(58) Field of Classification Search
CPC ............... H04B 17/318; H04W 24/10; H04W 36/0088; H04W 36/30; H04W 36/08; H04W 36/0069; H04W 48/20
See application file for complete search history.

(56) References Cited

U.S. PATENT DOCUMENTS

| | | |
|---|---|---|
| 2013/0215835 A1 | 8/2013 | Chen et al. |
| 2014/0112248 A1* | 4/2014 | Bergman .............. H04W 28/18 370/328 |
| 2014/0301337 A1* | 10/2014 | Hapsari ................. H04B 7/024 370/329 |
| 2015/0043457 A1 | 2/2015 | Liu et al. |
| 2015/0146641 A1* | 5/2015 | Kim ..................... H04L 5/0094 370/329 |
| 2016/0105834 A1 | 4/2016 | Gupta et al. |
| 2016/0241282 A1* | 8/2016 | Sano .................... H04B 1/1027 |

OTHER PUBLICATIONS

Gupta et al.,"Performance Analysis of Enhanced Dynamic Point Selection CoMP Scheme for Heterogeneous Networks", IEEE 83rd Vehicular Technology Conference (VTC Spring), May 15-18, 2016, 5 pages.

Agrawal et al., "Dynamic Point Selection for LTE-Advanced: Algorithms and Performance", IEEE Wireless Communications and Networking Conference (WCNC), Apr. 6-9, 2014, pp. 1392-1397.

Gupta et al., "Dynamic Point Selection Schemes for LTE-A Networks with Load Imbalance", IEEE 82nd Vehicular Technology Conference (VTC2015—Fall), Sep. 6-9, 2015, 5 pages.

International Search Report and Written Opinion received for corresponding Patent Cooperation Treaty Application No. PCT/CN2017/107161, dated Jul. 4, 2018, 9 pages.

* cited by examiner

METHOD AND APPARATUS FOR REALIZING DYNAMIC POINT SELECTION

RELATED APPLICATION

This application claims priority to PCT Application No. PCT/CN2017/107161, filed on Oct. 20, 2017, each of which is incorporated herein by reference in its entirety.

FIELD OF THE INVENTION

The present invention relates to a method and apparatus for realizing dynamic point selection, such as for release 8/9 TDD UEs.

BACKGROUND OF THE INVENTION

Dynamic Point Selection (DPS) is a downlink Coordinated Multipoint (CoMP) technique that switches the serving data Transmission Point (TP) of a User Equipment (UE) dynamically among the UE's cooperating set of TPs without requiring a cell handover. The prominent benefits of Dynamic Point Selection include cell-edge performance improvement due to TP selection diversity gains and dynamic UE load balancing benefits.

DPS functionality works using the channel measurement from CoMP set based on multiple Channel State Information (CSI) feedback framework that is supported in Transmission Mode 10 (TM10). Release 8/9 UEs do not support TM10 and hence cannot benefit by DPS. Moreover, with release 11 UEs, the UE chipset vendors do not seem to be supporting TM10 and multiple CSI feedback making the support of DPS CoMP schemes very challenging.

SUMMARY OF THE INVENTION

In one embodiment, an aspect of this invention relates to a method for realizing dynamic point selection with the method comprising the following steps:
  receiving estimated channel quality reported by all the TPs in the CoMP set;
  switching the serving TP for the UEs based on the estimated channel quality and/or cell load;
  forwarding the scheduled data from the primary TP to the serving TP;
  separately transmitting PDCCH to the UEs by the primary TP and transmitting PDSCH to the UEs by the serving TP.

In another embodiment, an aspect of this invention relates to an apparatus for realizing dynamic point selection, with the apparatus comprising the following modules:
  a module for receiving estimated channel quality reported by all the TPs in the CoMP set;
  a module for switching the serving TP for the UEs based on the estimated channel quality and/or cell load;
  a module for forwarding the scheduled data from the primary TP to the serving TP;
  a module for separately transmitting PDCCH to the UEs by the primary TP and transmitting PDSCH to the UEs by the serving TP.

As such, the implementation of this invention improves the cell-edge throughput and geometric mean of UE throughput by serving UEs instantaneously from the cell that provides better throughput accounting for fast time-scale channel fluctuations and/or load. It helps in reducing interference due to data getting drained faster when users are served from cells with better channel conditions.

BRIEF DESCRIPTION OF THE DRAWINGS

FIG. 4A is a schematic diagram illustrating PDSCH REs in primary TP.

FIG. 4B is a schematic diagram illustrating PDSCH REs in non-primary TP when CRS RE location of primary TP and serving TP are different.

DETAILED DESCRIPTION AND PREFERRED EMBODIMENT

Figure 1:
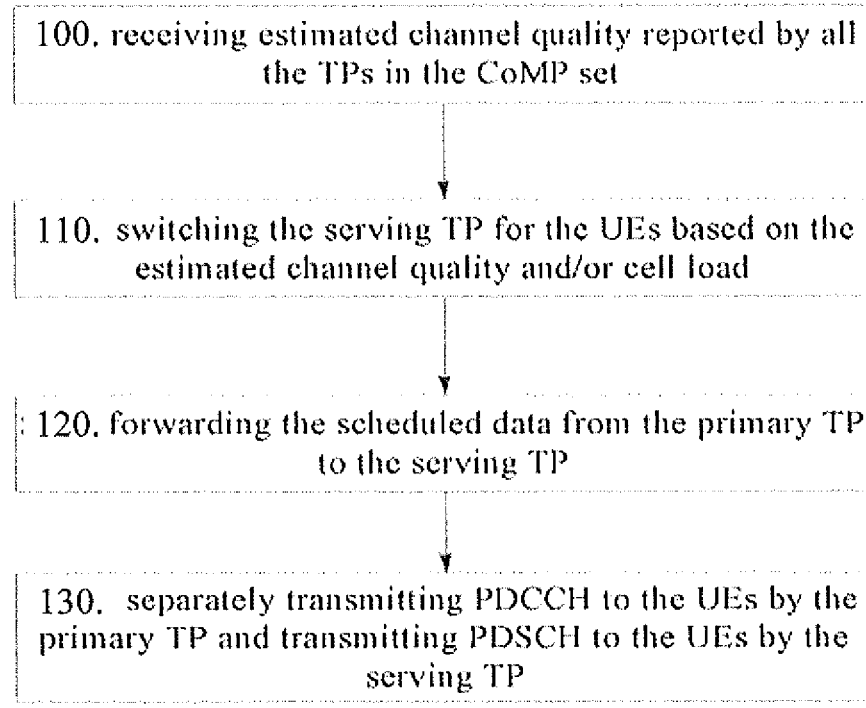
FIG. 1 is a flow chart illustrating a method of the present invention for realizing dynamic point selection.

The present invention will now be discussed in detail with regard to the attached drawing figures which are briefly described above. In the following description, numerous specific details are set forth illustrating the applicant's best mode for practicing the invention and enabling one of ordinary skill in the art of making and using the invention. It will be obvious, however, to one skilled in the art that the present invention may be practiced without many of these specific details. In other instances, well-known machines and method steps have not been described in particular detail in order to avoid unnecessarily obscuring the present invention. Unless otherwise indicated, like parts and method steps are referred to with like reference numerals.

Referring to FIG. 1, an embodiment of a method for realizing dynamic point selection comprises:

at step 100, receiving estimated channel quality reported by all the TPs in the CoMP set; and all those TPs inside CoMP set are supposed to be phase synchronized;

at step 110, switching the serving TP for the UEs based on the estimated channel quality and/or cell load;

at step 120, forwarding the scheduled data from the primary TP to the serving TP;

at step 130, separately transmitting PDCCH to the UEs by the primary TP and transmitting PDSCH to the UEs by the serving TP.

Specifically, at step 100, UE is Radio Resource Control (RRC) connected to the primary TP and has Sounding Reference Signal (SRS) configured. Then the CoMP set can be formed using Reference Signal Receiving Power (RSRP) measurement reports, and CoMP set is formed as a set of candidate neighbor TPs and primary TP.

Alternatively, all these TPs in the CoMP set estimate the channel quality based on UL SRS transmissions from the UE.

At step 110, MAC Packet Scheduler (PS) of primary TP decides the new serving TP based of DPS switching metric computation.

Alternatively, the step 110 comprises:

a step of deciding the Transmission Time Interval (TTI) that switching the UE to new serving TP based of the MAC PS of the primary TP;

a step of switching the serving TP transmitting to the UE.

Alternatively, the step 110 comprises:

a step of considering conservative spectral efficiency from non-primary TPs to compute the DPS switching metric.

Using the conservative TBS in DPS metric should enhance DPS gains because of switching the UE to non-primary TP only when target non-primary TP will provide better throughput overcoming the losses due to RE overhead.

At step 120, Radio Link Control (RLC) data is forwarded from primary TP to the serving TP. Typically, it's RLC Service Data Unit (SDU) data that is transferred, and based on the scheduled Transport Block Set (TB S), the RLC PDU is constructed by the serving TP.

Alternatively, the step of transmitting scheduled data from the primary TP to the serving TP comprises:

Pending Hybrid Automatic Repeat Request (HARQ) status and Outer Loop Link Adaptation (OLLA) are forwarded from old serving TP to new serving TP.

Figure 2:
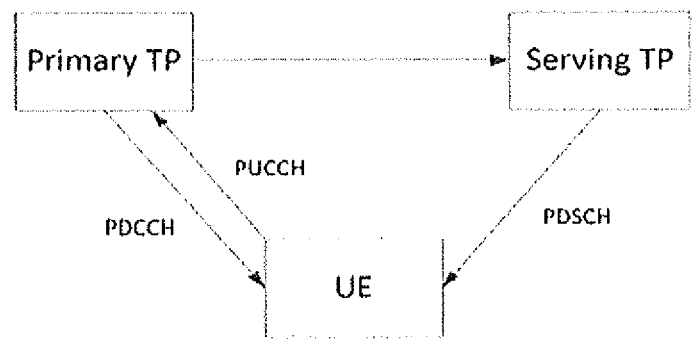
FIG. 2 is a block diagram illustrating DPS functions for realizing on release 8/9 UEs.

At step 130 as shown in FIG. 2, the serving TP transmits DL data to the UE by Physical Downlink Shared Channel (PDSCH). The primary TP will have its Cell Reference Signal (CRS) REs transmitted based on its Physical Cell Identifier (PCI), and the PDCCH carrying Downlink Control Information (DCI) for the scheduled data is transmitted by the primary TP. The UEs transmit UL data to the primary TP by Physical Uplink Control Channel (PUCCH).

Alternatively, PDSCH Modulation and Coding Scheme (MCS) is determined as per the channel measurement estimated for the serving TP.

During which, the estimation of the channel from current serving TP is done by Channel Quality Indicator (CQI) reported by UE+difference in SRS based channel measurement at primary TP and neighbor TP+OLLA+differences of DL Tx power between primary TP and neighbor TP.

Base of the embodiment of a method for realizing dynamic point selection, the present invention improves the cell-edge throughput and geometric mean of UE throughput by serving UEs instantaneously from the cell that provides better throughput accounting for fast time-scale channel fluctuations and/or load. It helps in reducing interference due to data getting drained faster when users are served from cells with better channel conditions.

In another embodiment, a method of the embodiment for realizing dynamic point selection will be described in detail.

In the prior art, DPS is a CoMP scheme that switches the serving TP of the UE based on the UE's channel and the cell load conditions. This TP switching can be done on a very fast time scale without requiring an elaborate handover procedure. The cell to which the UE has established an RRC connection is called the primary TP, and the cell that currently transmits to the UE is called the serving TP, and the serving cell would be selected from the CoMP set of the UE.

Although, several DPS schemes use the instantaneous CSI reports from the UE corresponding to different hypotheses on the serving TP from within the CoMP set for deciding the current serving TP based on appropriate DPS switching metrics. The measurements are performed by the UE based on the multiple CSI feedback framework supported by TM10 UE. The DCI information carried in PDCCH/Enhanced Physical Downlink Control Channel (ePDCCH) indicates to the UEs which TP is transmitting data over PDSCH on a per-TTI basis. UE is configured with the information of each TP in the CoMP set by RRC signaling (e.g., the cell id and hence the location of the cell reference signals), and hence is able to decode the received data from the current serving TP in any TTI.

The following are the challenges to realizing DPS functionality for a release 8/9 UE:

1) Release 8/9 UEs do not support TM10, and hence the multiple CSI feedback measurements corresponding to the hypotheses of each TP being the serving TP cannot be obtained.

2) REs that are used for PDSCH transmission from neighbor cell transmit CRS on designated REs that belongs to that TP. This causes conflicting interpretations of some of the REs by different UEs.

3) Release 8/9 UEs do not support ePDCCH. The PDCCH transmission to communicate the PDSCH RE allocation from neighbor TP is done from the primary TP.

Aiming at the above problems, this invention provides a solution for release 8/9 TDD UEs, where, by using the channel reciprocity in TDD and measurements based on SRS/Demodulation Reference Signal (DMRS) transmissions, which is able to estimate the channel for the UEs under the hypotheses that each of the TPs in their CoMP set is the serving TP. The best serving TP is determined based on these UL channel measurements, which is used as a surrogate for the multiple CSI feedback available for TM10 UEs. It is proposed to puncture REs (i.e., not perform any transmission) in the serving TP on the CRS REs of the primary TP on those Physical Resource block (PRB)s that are allocated to the UE whose primary TP is a different TP and CRS RE location of primary TP and serving TP are different.

In addition, the serving TP would transmit CRS at this cell's designated CRS locations for other UEs that would be using CRS for other purposes. Thus, the CRS overhead doubles for those release 8/9 UEs that are being served by a non-primary TP. Note that this additional overhead does not occur for TM10 UEs because the UE knows that it is being served by a different cell whose CRS locations are known. It is compensated for this loss of REs by using appropriately modifying the switching points for different MCSs to pick a more conservative MCS and by the use of OLLA which adapts to the observed Block Error Rate (BLER). The UE should be placed in a DMRS TM, i.e. TM7 for release 8 and TM7/8 for release 9 because the transmissions may be frequently switched from one serving TP to another, and the DMRS transmissions allow the UE to decode the data even when the serving TP (and hence the channel) changes significantly.

Figure 3:
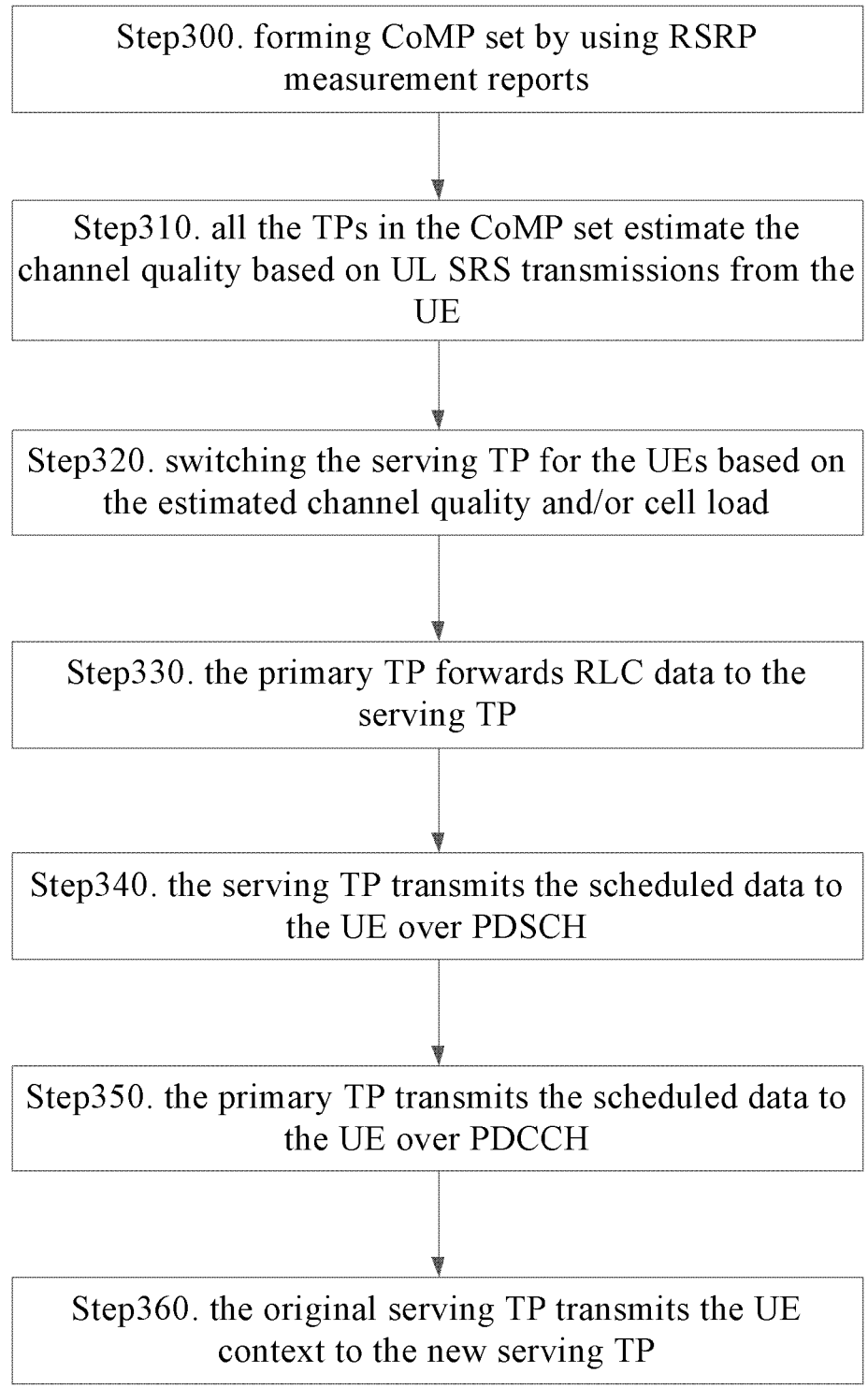
FIG. 3 is a flow chart illustrating a method of the embodiment for realizing dynamic point selection.

FIG. 3 illustrates a method for realizing dynamic point selection in accordance with an embodiment of this invention, including the following steps:

At step 300, forming CoMP set by using RSRP measurement reports.

The CoMP set is formed as a set of candidate neighbor TPs and primary TP. For instance, selecting best N (say, 2) TPs provided the RSRP of the neighbor TP is within a certain threshold of the primary TP.

At step 310, all these TPs in the CoMP set estimate the channel quality based on UL SRS transmissions from the UE.

These neighbor cells send these SRS-based channel quality measurements to the primary TP. This information is used by primary TP for DPS switching decision.

At step 320, switching the serving TP for the UEs based on the estimated channel quality and/or cell load.

MAC PS of primary TP decides the new serving TP every M TTIs (or event-triggered) based of DPS switching metric computation.

The DPS metric computation may account for 11% loss of REs when R8 UEs are served from a non-primary TP. In that case, such DPS switches towards non-primary TP should be avoided, because DPS enables the switching of serving TP based on instantaneous channel conditions but if the difference in the spectral efficiency between primary TP and non-primary target TP is less compared to the loss in REs when served by non-primary TP.

Thus, in this embodiment, it is proposed to consider conservative spectral efficiency from non-primary TPs to compute the DPS switching metric, i.e., if TBS1 and TBS2 are the estimated bits that UE will receive from primary TP and non-primary TP (assuming whole bandwidth) respectively then the DPS metric computation will use following:

$TBS_{primaryTP} = TBS_1$ $TBS_{non-primaryTP} = TBS_2 * \eta$, where $\eta$ is the fraction of REs available for PDSCH in the non-primary as a fraction of those available in the primary TP. For the 2 Tx antenna normal CP case, $\eta$ will be equal to 0.899

This altered TBS can be used in all DPS schemes.

Using the conservative TBS in DPS metric should enhance DPS gains because of switching the UE to non-primary TP only when target non-primary TP will provide better throughput overcoming the losses due to RE overhead.

At step 330, the primary TP forwards RLC data to the serving TP.

Typically, it's RLC SDU data that is transferred, and based on the scheduled TBS, the RLC PDU is constructed by the serving TP.

At step 340, the serving TP transmits the scheduled data to the UE over PDSCH.

PDSCH MCS is determined as per the channel measurement estimated for the serving TP. Estimation of the channel from current serving TP should be done by CQI reported by UE (for primary TP)+difference in SRS based channel measurement at primary TP and neighbor TP+OLLA+differences of DL Tx power between primary TP and neighbor TP.

The CRS REs of the serving TP would be transmitted at the regular locations based on its PCI. The primary TP will have its CRS REs transmitted based on its PCI. Thus, the overhead seen by the release 8 UE for such a DPS transmission would be twice the overhead of CRS REs (more details later).

At step 350, the primary TP transmits the scheduled data to the UE over PDCCH.

The UE is placed in a DMRS TM because the transmissions may be frequently switched from one serving TP to another. The DMRS-based transmission will help the UE decode the data even if the serving TP has changed, because the UE sees the combined impact of the channel and the precoder on the DMRS REs, and it does not rely on the CRS-based channel estimation of the primary TP's CRS REs for data demodulation.

At step 360, the original serving TP transmits the UE context to the new serving TP.

The primary TP needs follow all UE context, so UE context such as pending HARQ status, OLLA, etc. are forwarded from old serving TP to primary TP and new serving TP. HARQ retransmission of pending HARQ packets would be done from the current serving TP.

PDCCH symbols are assumed to be same on both the TPs, therefore Physical Control Format Indicator Channel (PCFICH) may be decoded from the primary TP. In practice, the number of PDCCH symbols could be a fixed value in DPS-enabled areas for release 8/9 UEs.

Figures 4A, 4B:
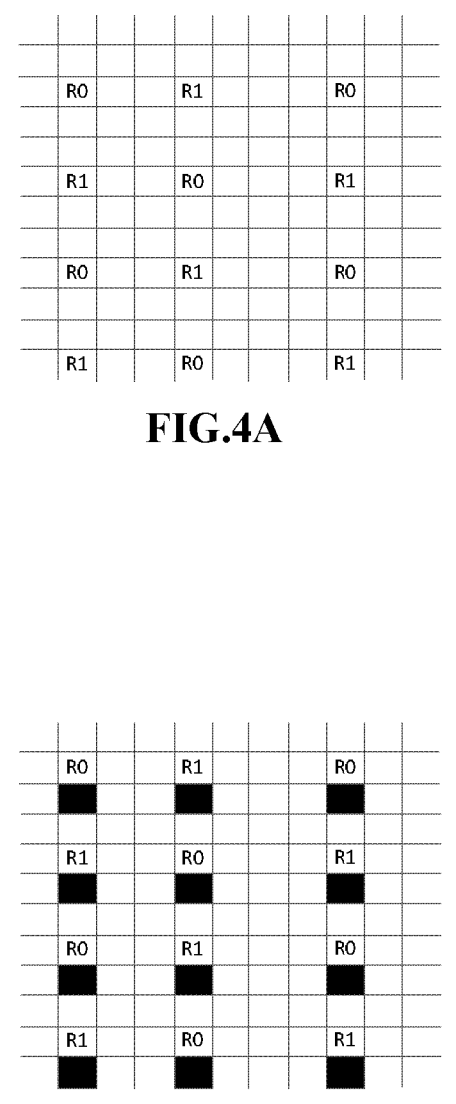

FIG. 4A and FIG. 4B illustrate that if the UE is being served from a non-primary TP and the CRS RE location of primary and non-primary TP do not match (typically, they should not match), then the CRS RE locations of both the primary and serving TP cannot be used to transmit PDSCH. FIG. 2 shows PDSCH REs in a PRB for a release 8/9 UE with 2Tx antenna for the cases if it gets DL data transmission from primary TP (FIG. 4A) or non-primary TP (FIG. 4B). Note that the PDCCH REs (for ex. 3 symbols) are not shown here. For 2Tx antenna, the number of CRS REs per PRB in the PDSCH part is 12, but this increases to 24 for release 8/9 UEs served from a non-primary TP.

When a release 8/9 UE is served by a non-primary TP, it will not try to decode the data on the CRS RE locations of primary TP and hence non-primary TP does not need to transmit PDSCH data on these REs in the PRBs that are allocated to this UE. This is a 11% reduction in the total available PDSCH data REs for a release 8/9 UE being served from a non-primary TP. While doing RE mapping of PDSCH in non-primary TPs, the RE mapping should be done as though the transmission is being done in the primary TP. However, PDSCH should not be transmitted in the CRS RE locations of the non-primary TP. The larger probability of decode error due to the larger CRS overhead should be corrected by using conservative MCS and OLLA. DPS gains should be substantial enough to compensate for this loss of REs and the larger probability of decode error.

This embodiment provides the DPS scheme which improves the cell-edge throughput and geometric mean of UE throughput by serving UEs instantaneously from the cell that provides better throughput accounting for fast time-scale channel fluctuations and/or load. It helps in reducing interference due to data getting drained faster when users are served from cells with better channel conditions.

Figure 5:
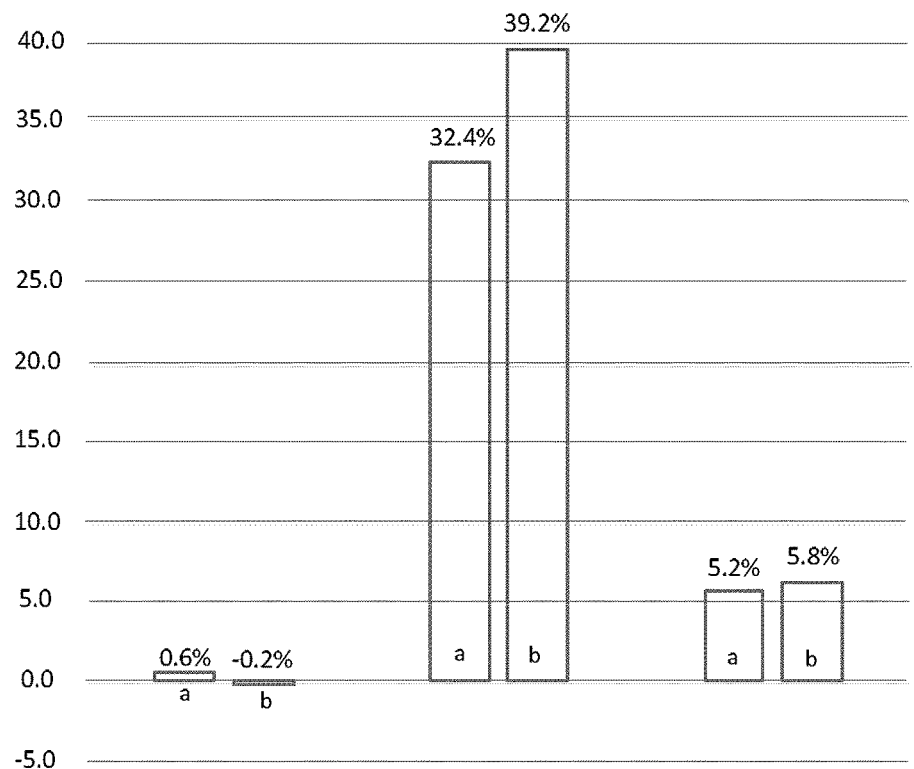
FIG. 5 is a schematic diagram illustrating DPS performance gains for full buffer traffic, 2 dB Handover Margin.
Figure 6:
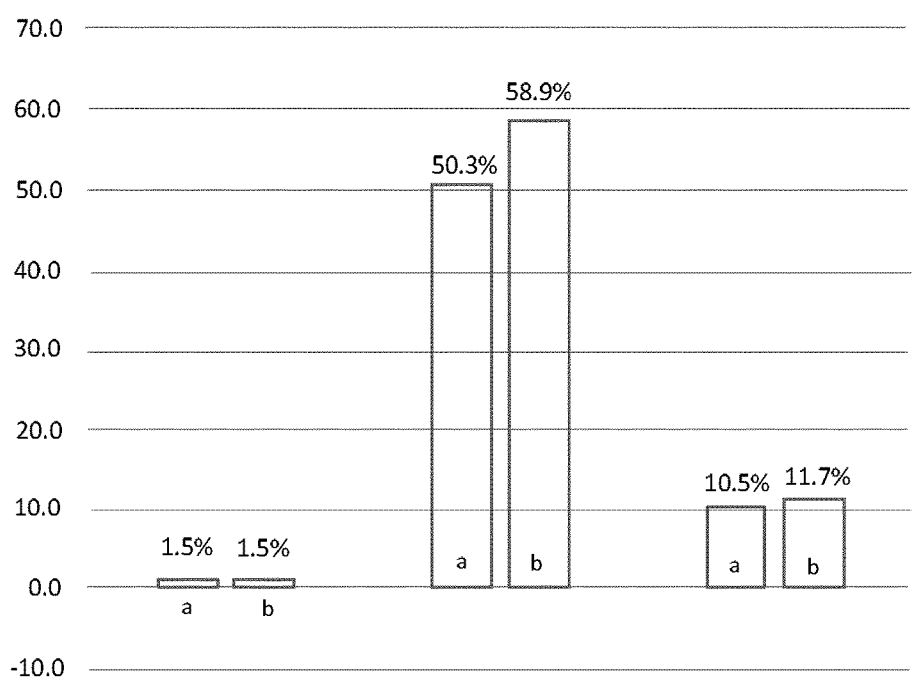
FIG. 6 is a schematic diagram illustrating DPS performance gains for bursty traffic, 2 dB Handover Margin.

The simulation results in FIG. 5 and FIG. 6 show substantial performance gains with SE-based and load-based DPS schemes over non-CoMP baseline for release 8/9 UEs, for full-buffer traffic and bursty traffic with 10 Mbps offered cell load. SE-based DPS improves the system performance by switching the transmission point dynamically such that the UE is served from the TP that provides best instantaneous channel quality. Load-based DPS further enhances the performance by serving UEs from those TPs that provides the largest throughput, which takes into account the combined impact of the UE's channel conditions and the load in to the two TPs. Substantial gains in cell-edge UE throughput and geometric mean of UE throughput are observed with DPS for release 8/9 UEs. Load-based DPS provides higher gains compared to SE-based DPS.

From FIG. 5 to FIG. 6, the vertical coordinates mean DPS gains (%), the left group of histograms on the horizontal coordinates represents average throughput, the middle group of histograms on the horizontal coordinates represents cell-edge throughput, the right group of histograms on the horizontal coordinates represents geometric mean. In each group of histograms, the column a represents SE DPS, the column b represents Load DPS.

Figure 7:
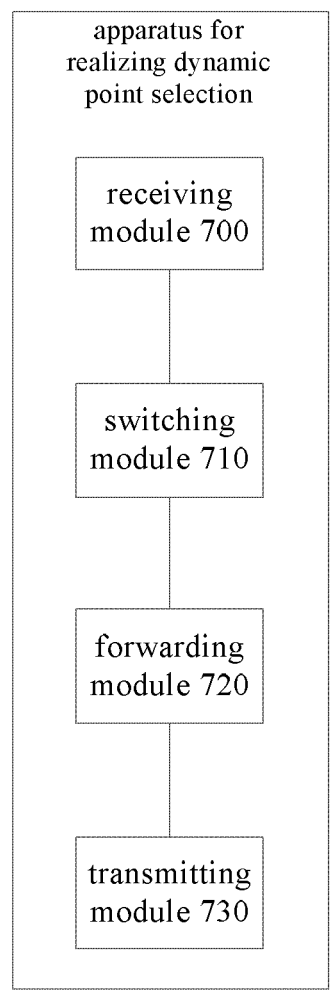
FIG. 7 is a block diagram illustrating an apparatus of the present invention for realizing dynamic point selection.

FIG. 7 illustrates an embodiment of an apparatus for realizing dynamic point selection, including the following modules:

a module for receiving estimated channel quality reported by all the TPs in the CoMP set (receiving module 700);

a module for switching the serving TP for the UEs based on the estimated channel quality and/or cell load (switching module 710);

a module for transmitting the scheduled data from the primary TP to the serving TP (forwarding module 720);

a module for separately transmitting PDCCH to the UEs by the primary TP and transmitting PDSCH to the UEs by the serving TP (transmitting module 730).

Alternatively, the receiving module 700 comprises:

a module for estimating the channel quality based on UL SRS transmissions from the UE.

Alternatively, the receiving module 700 comprises:

a module for forming the CoMP set as a set of candidate neighbor TPs and primary TP by using RSRP measurement reports.

Alternatively, the switching module 710 comprises:

a module for deciding the UE switched to the new serving TP every M TTIs based of DPS switching metric computation;

a module for switching the PDSCH transmission to the UE from new serving TP.

Alternatively, the switching module 710 comprises:

a module for considering conservative spectral efficiency from non-primary TPs to compute the DPS switching metric.

Alternatively, the forwarding module 720 comprises:

a module for forwarding the RLC SDU data from the primary TP to the serving TP, and the RLC PDU data is constructed by the serving TP.

Alternatively, the forwarding module 720 comprises:

a module for forwarding the UE's pending HARQ status and OLLA to the serving TP.

Alternatively, the transmitting module 730 comprises:

a module for determining the PDSCH MCS by each channel measurement estimated for the serving TP.

Alternatively, the transmitting module 730 comprises:

a module for determining the estimation of each channel measurement by the CQI reported by UE, the difference in SRS based channel measurement at primary TP, the neighbor TP and OLLA.

Figure 8:
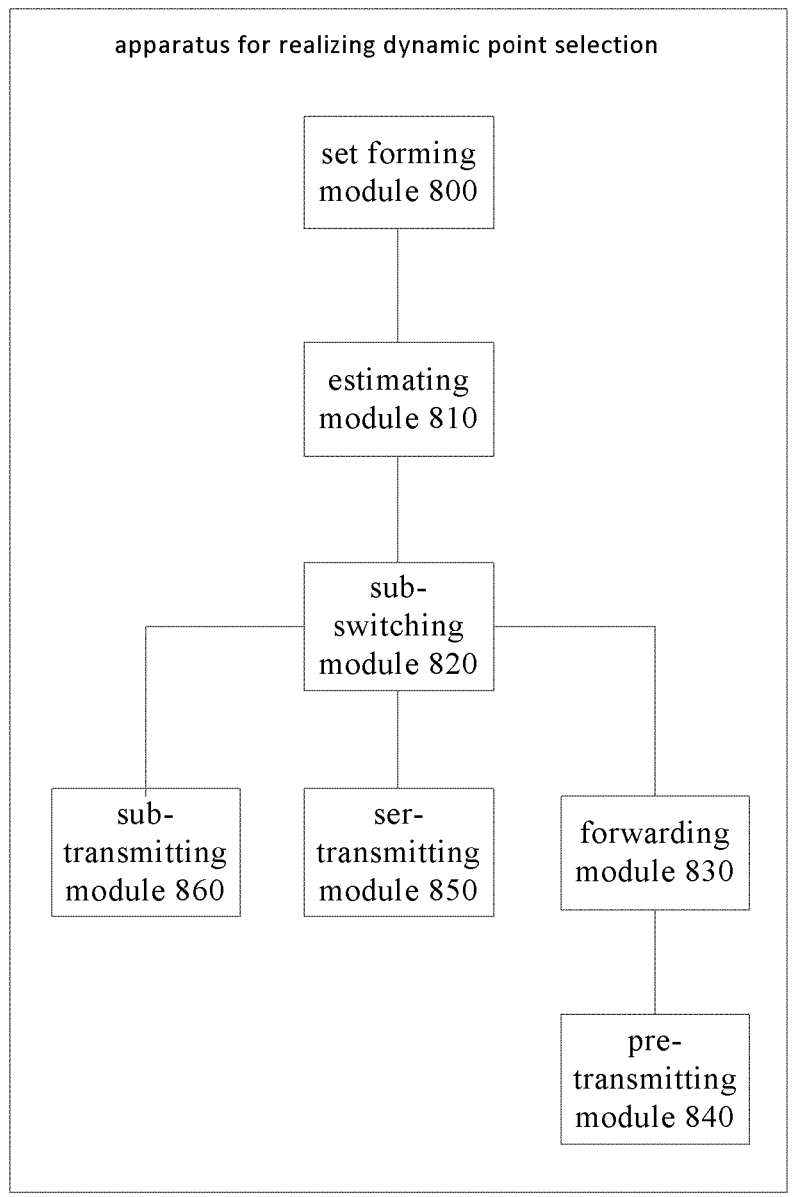
FIG. 8 is a block diagram illustrating an apparatus of the embodiment for realizing dynamic point selection.

FIG. 8 illustrates an embodiment of an apparatus for realizing dynamic point selection, including the following modules:

a module for forming CoMP set by using RSRP measurement reports (set forming module 800);

a module for estimating the channel quality based on UL SRS transmissions from the UE (estimating module 810);

a module for switching the serving TP for the UEs based on the estimated channel quality and/or cell load (sub-switching module 820);

a module for forwarding RLC data to the serving TP (forwarding module 830);

a module for transmitting the scheduled data to the UE over PDSCH (pre-transmitting module 840);

a module for transmitting the control information of scheduled data to the UE over PDCCH (ser-transmitting module 850);

a module for transmitting the UE context to the new serving TP (sub-transmitting module 860).

The CoMP set is formed by the estimating module 810 as a set of candidate neighbor TPs and primary TP. For instance, selecting best N (say, 2) TPs provided the RSRP of the neighbor TP is within a certain threshold of the primary TP.

The neighbor cells send these SRS-based channel quality measurements estimated by the estimating module 810 to the primary TP. This information is used by primary TP for DPS switching decision.

MAC PS of primary TP decides the new serving TP every M TTIs (or event-triggered) based of DPS switching metric computation, and the sub-switching module 820 switch the serving TP for the UE.

Typically, the forwarding module 830 transfers the RLC SDU data, and based on the scheduled TBS, the RLC PDU is constructed by the serving TP.

PDSCH MCS is determined by the pre-transmitting module 840 as per the channel measurement estimated for the serving TP. Estimation of the channel from current serving TP should be done by CQI reported by UE (for primary TP)+difference in SRS based channel measurement at primary TP and neighbor TP+OLLA+differences of DL Tx power between primary TP and neighbor TP.

The CRS REs of the serving TP would be transmitted at the regular locations based on its PCI. The primary TP will have its CRS REs transmitted based on its PCI. Thus, the overhead seen by the release 8 UE for such a DPS transmission would be twice the overhead of CRS REs if CRS resource element (RE) location of primary TP and serving TP are different (more details later).

The ser-transmitting module 850 place the UE in a DMRS TM because the transmissions may be frequently switched from one serving TP to another. The DMRS-based transmission will help the UE decode the data even if the serving TP has changed, because the UE sees the combined impact of the channel and the precoder on the DMRS REs, and it does not rely on the CRS-based channel estimation of the primary TP's CRS REs for data demodulation.

UE context such as pending HARQ status, OLLA, etc. are forwarded from old serving TP to new serving TP. HARQ retransmission of pending HARQ packets would be done from the current serving TP.

The sub-transmitting module 860 transfers the UE context to the new serving TP because PDCCH symbols are assumed to be same on both the TPs, therefore PCFICH may be decoded from the primary TP. In practice, the number of PDCCH symbols could be a fixed value in DPS-enabled areas for release 8/9 UEs.

FIG. 4A and FIG. 4B illustrate that if the UE is being served from a non-primary TP and the CRS RE location of primary and non-primary TP do not match (typically, they should not match), then the CRS RE locations of both the primary and serving TP cannot be used to transmit PDSCH. FIG. 2 shows PDSCH REs in a PRB for a release 8/9 UE with 2Tx antenna for the cases if it gets DL data transmission from primary TP (left) or non-primary TP (right). Note that the PDCCH REs (for ex. 3 symbols) are not shown here. For 2Tx antenna, the number of CRS REs per PRB in the PDSCH part is 12, but this increases to 24 for release 8/9 UEs served from a non-primary TP.

When a release 8/9 UE is served by a non-primary TP, it will not try to decode the data on the CRS RE locations of primary TP and hence non-primary TP does not need to transmit PDSCH data on these REs in the PRBs that are allocated to this UE. This is a 11% reduction in the total available PDSCH data REs for a release 8/9 UE being served from a non-primary TP. While doing RE mapping of PDSCH in non-primary TPs, the RE mapping should be done as though the transmission is being done in the primary TP. However, PDSCH should not be transmitted in the CRS RE locations of the non-primary TP. The larger probability of decode error due to the larger CRS overhead should be corrected by using conservative MCS and OLLA. DPS gains should be substantial enough to compensate for this loss of REs and the larger probability of decode error.

This embodiment provides the DPS scheme which improves the cell-edge throughput and geometric mean of UE throughput by serving UEs instantaneously from the cell that provides better throughput accounting for fast time-scale channel fluctuations and/or load. It helps in reducing interference due to data getting drained faster when users are served from cells with better channel conditions.

Note that the invention is not limited to the embodiments described hereinabove, but extends to all the embodiments that are in accordance with its idea. The alternatives or options described in this part stein directly from the description of the preceding technological steps. They are valid for the illustrative applications such as micro-batteries but can be transposed to other microelectronic components. Unless mentioned otherwise, the steps that describe the examples presented in each part are based on the same principles mentioned beforehand.

The invention claimed is:

1. An apparatus for realizing dynamic point selection, comprising:
   at least one processor; and
   at least one non-transitory storage medium including computer program code;
   wherein the at least one storage medium and the computer program code are configured to, with the at least one processor, cause the apparatus at least to:
   receive estimated channel quality from transmission points in a coordinated multipoint set as reported with the transmission points in the coordinated multipoint set;
   switch a serving transmission point for user equipments based on the estimated channel quality and/or cell load, to determine the serving transmission point in the coordinated multipoint set that is to transmit a respective physical downlink shared channel to a respective user equipment of the user equipments;
   forward scheduled data from a primary transmission point to the serving transmission point;
   separately transmit a respective physical downlink control channel to the respective user equipment of the user equipments with the primary transmission point and transmit the respective physical downlink shared channel to the respective user equipment of the user equipments with the serving transmission point.

2. The apparatus of claim 1, wherein the receiving the estimated channel quality reported with the transmission points (TPs) in the coordinated multipoint (CoMP) set comprises:
   estimating the channel quality based on uplink (UL) sounding reference signal (SRS) transmissions from at least one of the user equipments (UEs).

3. The apparatus of claim 1, wherein the receiving the estimated channel quality reported with the transmission points (TPs) in the coordinated multipoint (CoMP) set comprises:
   forming the CoMP set as a set of candidate neighbor TPs and the primary transmission point (TP) with using reference signal receiving power (RSRP) measurement reports.

4. The apparatus of claim 1, wherein the switching the serving transmission point (TP) for the user equipments (UEs) based on the estimated channel quality and/or cell load comprises:

deciding the UEs switched to the serving TP every M transmission time intervals (TTIs), where M is an integer greater than or equal to 1, based on dynamic point selection (DPS) switching metric computation;
switching the physical downlink shared channel (PDSCH) transmission to the respective user equipment (UE) from the serving TP.

5. The apparatus of claim 4, wherein the switching the serving TP for the UEs based on the estimated channel quality and/or the cell load comprises:
   considering conservative spectral efficiency from non-primary transmission points (TPs) to compute the DPS switching metric.

6. The apparatus of claim 1, wherein the forwarding the scheduled data from the primary transmission point (TP) to the serving TP comprises:
   forwarding during the dynamic point selection of the primary TP and the serving TP without a cell handover, radio link control (RLC) service data unit (SDU) data from the primary TP to the serving TP, and RLC protocol data unit (PDU) data is constructed with the serving TP.

7. The apparatus of claim 1, wherein the forwarding the scheduled data from the primary transmission point (TP) to the serving TP comprises:
   forwarding a pending hybrid automatic repeat request (HARQ) status of the respective user equipment (UE) of the user equipments and outer loop link adaptation (OLLA) to the serving TP.

8. The apparatus of claim 1, wherein the separately transmitting physical downlink control channel (PDCCH) to the user equipments (UEs) with the primary transmission point (TP) and transmitting physical downlink shared channel (PDSCH) to the UEs with the serving TP comprises:
   determining a PDSCH modulation and coding scheme (MCS) with each channel measurement estimated for the serving TP.

9. The apparatus of claim 8, wherein the separately transmitting PDCCH to the UEs with the primary TP and transmitting PDSCH to the UEs with the serving TP comprises:
   determining each channel measurement estimated for the serving TP with a channel quality indicator (CQI) reported with the respective user equipment (UE), the difference in sounding reference signal (SRS) based channel measurement at the primary TP, a neighbor TP, outer loop link adaptation (OLLA) and differences of downlink (DL) transmission (Tx) power between the primary TP and the neighbor TP.

10. A method for realizing dynamic point selection, comprising:
    receiving estimated channel quality from transmission points in a coordinated multipoint set as reported with the transmission points in the coordinated multipoint set;
    switching a serving transmission point for user equipments based on the estimated channel quality and/or cell load;
    forwarding scheduled data from a primary transmission point to the serving transmission point;
    separately transmitting a respective physical downlink control channel to a respective user equipment of the user equipments with the primary transmission point TP and transmitting a respective physical downlink shared channel to the respective user equipment of the user equipments with the serving transmission point.

11. The method of claim 10, wherein the channel quality is estimated based on uplink (UL) sounding reference signal (SRS) transmissions from at least one of the user equipments (UEs).

12. The method of claim 10, wherein the coordinated multipoint (CoMP) set is formed using reference signal receiving power (RSRP) measurement reports, and the CoMP set is formed as a set of candidate neighbor transmission points (TPs) and primary transmission point (TP).

13. The method of claim 10, wherein switching the serving transmission point (TP) for the user equipments (UEs) based on the estimated channel quality and/or cell load comprises:
    deciding the UEs switched to the serving TP every M transmission time intervals (TTIs), where M is an integer greater than or equal to 1, based on dynamic point selection (DPS) switching metric computation;
    switching the physical downlink shared channel (PDSCH) transmission to the respective user equipment (UE) from the serving TP.

14. The method of claim 13, wherein switching the serving TP for the UEs based on the estimated channel quality and/or cell load comprises:
    considering conservative spectral efficiency from non-primary transmission points (TPs) TPs to compute the DPS switching metric.

15. The method of claim 10, wherein forwarding the scheduled data from the primary transmission point (TP) to the serving TP comprises:
    forwarding, during the dynamic point selection of the primary TP and the serving TP without a cell handover, radio link control (RLC) service data unit (SDU) data from the primary TP to the serving TP, and RLC protocol data unit (PDU) data is constructed with the serving TP.

16. The method of claim 10, wherein forwarding the scheduled data from the primary transmission point (TP) TP to the serving TP comprises:
    forwarding a pending hybrid automatic repeat request (HARQ) status of the respective user equipment (UE) of the user equipments and outer loop link adaptation (OLLA) to the serving TP.

17. The method of claim 10, wherein a physical downlink shared channel modulation and coding scheme (MCS) is determined with each channel measurement estimated for the serving transmission point (TP).

18. The method of claim 17, wherein the channel measurement estimated for the serving TP is determined with a channel quality indicator (CQI) reported with the respective user equipment (UE), the difference in sounding reference signal (SRS) based channel measurement at the primary TP, a neighbor TP, outer loop link adaptation (OLLA) and differences of downlink (DL) transmission (Tx) power between the primary TP and the neighbor TP.

19. A computer product, comprising:
    one or more processors;
    non-transitory storage of storing one or more computer programs;
    when the one or more computer programs are executed with the one or more processors, the one or more processors implement the method of claim 10.

20. A non-transitory computer readable storage medium, storing computer code, when the computer code is executed, causes at least:
    receiving estimated channel quality from transmission points in a coordinated multipoint set as reported with the transmission points in the coordinated multipoint set;
    switching a serving transmission point for user equipments based on the estimated channel quality and/or cell load, to determine the serving transmission point in the coordinated multipoint set that is to transmit a respective physical downlink shared channel to a respective user equipment of the user equipments;
    forwarding scheduled data from a primary transmission point to the serving transmission point;
    separately transmitting a respective physical downlink control channel to a respective user equipment of the user equipments with the primary transmission point and transmitting the respective physical downlink shared channel to the respective user equipment of the user equipments with the serving transmission point.

* * * * *